OR 3,832,026

T3052H

United States
Mottier

[11] 3,832,026
[45] Aug. 27, 1974

[54] HOLOGRAPHY USING LIGHT OF LIMITED COHERENCE

[75] Inventor: François Mottier, Zurich, Switzerland

[73] Assignee: BBC Brown Boveri & Company, Limited, Baden, Switzerland

[22] Filed: May 11, 1972

[21] Appl. No.: 252,253

[30] Foreign Application Priority Data
May 14, 1971 Switzerland.......................... 7180/71

[52] U.S. Cl............................... 350/3.5, 356/106 R
[51] Int. Cl. ........................................... G02b 27/00
[58] Field of Search....................... 350/3.5; 356/106

[56] References Cited
UNITED STATES PATENTS
3,578,837   5/1971   Brooks................................. 350/3.5
3,627,426   12/1971  Tsuruta et al....................... 350/3.5
3,729,249   4/1973   Habegger et al................... 350/3.5

OTHER PUBLICATIONS
Shamir et al., "Holography with 1–mW Laser" AJP, Vol. 39, July 1971, pp. 840–841.

Primary Examiner—Ronald L. Wibert
Attorney, Agent, or Firm—Oblon, Fisher, Spivak, McClelland & Maier

[57] ABSTRACT

A method is disclosed for forming good quality holograms using light of only limited coherence. According to the method, a hologram plate is illuminated by a reference laser beam and by laser light scattered from an object of which a hologram is to be formed. Local intensity fluctuations having maxima and minima are formed at the object for each frequency of light in the laser beam. Good holograms are formed provided that the intensity maxima belonging to one frequency of the laser light do not predominantly coincide with the intensity maxima of any other frequency of the laser light.

4 Claims, 2 Drawing Figures

PATENTED AUG 27 1974 3,832,026

HOLOGRAPHY USING LIGHT OF LIMITED COHERENCE

BACKGROUND OF THE INVENTION

1. Field of the Invention

The present invention relates to a method of producing holograms using light of limited coherence, the hologram plate being illuminated by the reference light beam and the object light, scattered by the object and stemming from the same laser.

2. Description of the Prior Art

It is well known that holographic records of objects of substantial spatial depth are only possible if lasers exhibiting a very high degree of spectral purity are used. If lasers are used which oscillate in several longitudinal modes and whose radiation therefore only has a limited coherence length, for example ruby or other pulse lasers, then a usable hologram can only be obtained if the differences in the distance travelled by object and reference light components to the hologram plate are less than the coherence length of the laser. It is of course possible to set the coherence length to several meters by suitable design of the optical resonator, using frequency selection, but, because of thermal expansion, the resonator may drift to such an extent that the coherence length drops to only a few centimetres.

In order to be able to produce usable holograms with multimode lasers, i.e., using light of limited coherence, it is well known (see W. Tschiedel et al. in Z. angew. Phys. 31 Edition 1, (1971), pp 15 to 21), to split the reference light beam into two subsidiary beams which follow different paths to the hologram plate so that the difference in distance is not equal to $(2m + 1) \cdot \lambda_o/2$, where $m$ is a positive integer and $\lambda_o$ the mean wavelength of the multimode laser. By this method, holographic records are produced of objects, in which between object and reference beams differences in transit distance of up to 4 meters occur. Instead of directing the two beams, which differ from one another in terms of the paths they follow, together and at the same angle onto the hologram plate, it is desirable that the said advantage should also be obtainable where the two subsidiary beams are incident on the hologram plate while making a determinate angle with one another.

From the practical point of view, the known method has the drawback that in the case of parallel subsidiary beams, extremely accurate adjustment is required and in the case of inclined subsidiary beams, determinate angles of inclination and a very special arrangement of two detectors at the location of the hologram, are needed.

SUMMARY OF THE INVENTION

Accordingly, one object of this invention is to provide a novel method of producing holograms.

Another object of this invention is to provide a method of producing good holograms using light of limited coherence.

Yet another object of this invention is to make it possible to produce good holograms using light of limited coherence, at the expense of an outlay which can be accepted in practice.

Briefly, these and other objects of the invention are generally achieved in that, with respect to each frequency contained in the laser light, local fluctuations in intensity are produced at the object of which the hologram is being formed in such a fashion that the intensity maxima belonging to one frequency do not predominately coincide with the intensity maxima of any other frequency contained in the laser light.

In accordance with preferred embodiments of the invention, the light beam intended to illuminate the object may be split into two subsidiary beams which are then directed, in an inclined relationship to one another, onto the object of which the hologram is being formed, or may be directed onto a body which produces diffuse scattering. In the latter case, the object of which the hologram is being formed is illuminated by the scattered light emanating from the diffusely scattering body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
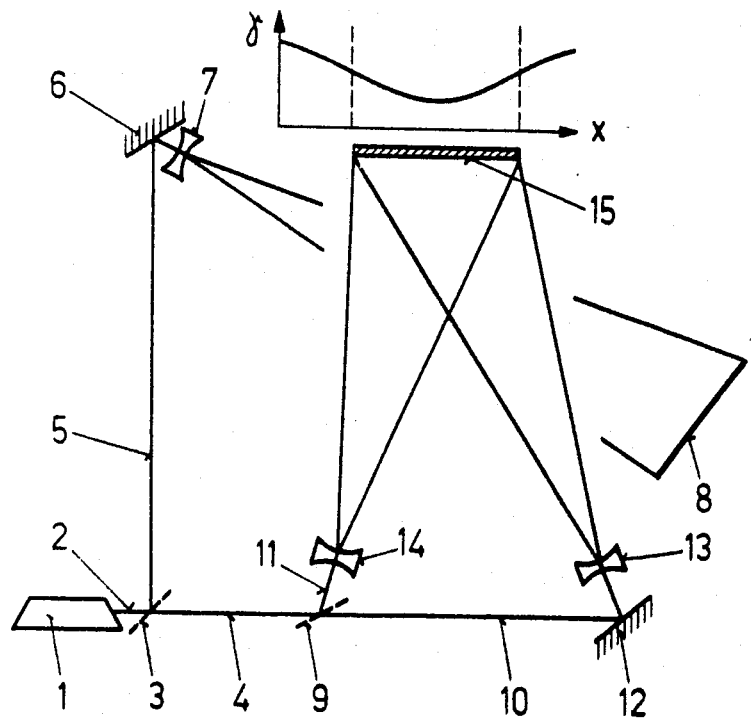
FIG. 1 schematically illustrates an arrangement in which the object light beam is split into two subsidiary beams and these latter two beams are directed in an inclined relationshp to one another, onto the object.

Referring now to the drawings, wherein like reference numerals designate identical or corresponding parts throughout the several views, and more particularly to FIG. 1 thereof, a laser 1 is illustrated whose light beam 2 is split by means of a beam-splitter 3 into an object light beam 4 and a reference light beam 5. The beam 5 is deflected by a mirror 6 and, after an expansion by a lens 7 is directed onto the hologram plate 8. The beam 4 is split by a second beam-splitter 9 into two subsidiary beams 10 and 11, the beam 10, after deflection at the mirror 12 and expansion by the lens 13 being directed in an inclined relationship to the beam 11, which has been expanded by the lens 14, onto the object 15. The hologram plate 8 receives the light scattered by the object 15.

Objects of which holograms are formed are, in practice, predominantly bodies which produce diffuse scattering. When illuminated with laser light, bodies of this kind have a speckled appearance [e.g., JOSA 55 (1965) 247]. If the illuminating laser radiation contains more than one frequency, i.e., has only limited coherency, and if it is directed onto the object in the form of two mutually inclined subsidiary beams in the manner shown in FIG. 1, then the spots on the object exhibit contrast maxima and minima (Swiss Pat. No. 529,343 Pat. application Ser. No. 2637/71). This phenomenon can be explained by virtue of the fact that each frequency contained in the laser light of one subsidiary beam, produces together with the same frequency in the other subsidiary beam, an interference fringe system on the object. This fringe system exhibits a fringe width dependent in the usual manner upon the frequency, so that with respect to each frequency, local fluctuations in intensity occur. Because of the differing fringe widths, regions then occur in which the intensity maxima of the fringes stemming from different frequencies coincide with one another, and also regions in which intensity maxima and minima coincide. The first mentioned regions are regions exhibiting speckles of high contrast, whilst the last mentioned ones are regions exhibiting speckles of low contrast.

In FIG. 1, the contrast characteristic $\gamma(x)$ along the object 15, has been plotted in the form of a curve. In accordance with the invention, the intensity maxima (of the interference fringes) belonging to each frequency, shall not predominantly coincide with the intensity maxima (of the interference fringes) of any other frequency. This, as explained above, is the case where the contrast $\gamma(x)$ has a minimum, so that in FIG. 1 the object 15 is arranged at the location of this minimum.

Using the arrangement illustrated, good holograms of extended objects or of objects with substantial spatial depth, can be obtained even using so-called multimode lasers, that is to say lasers having limited coherence and oscillating in more than one mode, or using lasers which, although emitting a discrete frequency as a consequence of frequency selection, tend to detune as a consequence of mechanical change in the optical resonators so that they then only exhibit limited coherence. The adjustment of the arrangement is relatively simple because the object of which the holographic record is to be formed can be placed at the location of minimum speckle contrast without requiring any particular measurement outlay. The width of the regions of minimum speckle contrast can be varied in a simple manner by modification of the angle of inclination between the two subsidiary beams 10, 11 (Swiss Pat. No. 529,343 Pat. application Ser. No. 2637/71).

Figure 2:
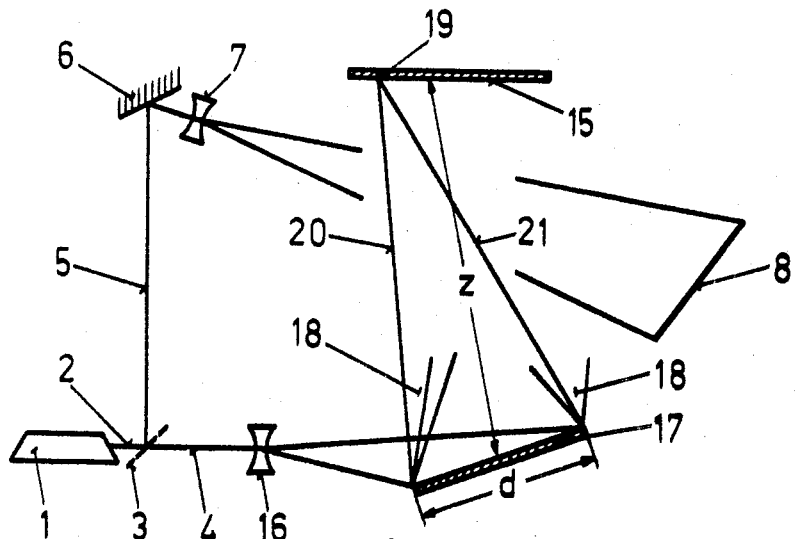
FIG. 2 schematically illustrates an arrangement in which the object light beam is scattered onto the object via a diffuser.

In FIG. 2, a variant of the invention which is particularly important in practical applications, is illustrated. Here, the object light beam 4 is not split into two subsidiary beams in the manner shown in FIG. 1, but after expansion, is directed onto a diffusely scattering body 17, which may be for example, a matt white-painted plate, or an opal or ground-glass screen. The object 15 is then illuminated by the scattered light 18 reflected by the body 17. Instead of arranging the body 17 for reflection, it is possible, using an opal or ground-glass screen, to illuminate the object 15 by transmission.

With this arrangement or its indicated variant, shown in FIG. 2, good holograms of extended bodies can be obtained by illumination with laser light of limited coherence. The explanation of this resides in the fact that the diffusely scattering body 17 produces at the object 15 of which the holographic record is to be formed, local intensity fluctuations with respect to each frequency contained in the laser light [JOSA 61 (1971) 559], the intensity maxima belonging to one frequency on statistical average not coinciding with the intensity maxima of any other frequency contained in the laser light.

The diffusely scattering body 17 is so designed and arranged, in terms of its dimension $d$, its spacing Z from the object 15 and its position vis-a-vis the illuminating beam 4 after the latter's expansion by the lens 16, as well as in terms of its position vis-a-vis the object 15 such that at least two of the beams from the diffusely scattering body 17 (e.g., the beams 20 and 21) are incident on a point 19 of the object 15, and the paths taken by these beams between the laser 1 and the object point 19 differ from one another by at least one coherence length of the laser. All object points with respect to which these preconditions are satisfied, will be well recorded by the hologram even if the illumination employs light of limited coherence.

The success of the invention can be explained by the fact that because of the local separation of the intensity maxima belonging to different frequencies different diffusely scattering regions of the object are illuminated so that on the hologram plate 8 there is recorded with respect to each frequency a hologram which is uncorrelated with respect to those of the other frequencies and cannot therefore give rise to interference. With respect to the hologram relating to one frequency, the other frequencies simply create an incoherent background which, while it to some extent reduces the efficiency, produces no other disturbance. The local intensity fluctuations which belong to a frequency will conveniently be such that the extent of an intensity maximum or minimum remains below the level of optical resolution.

Obviously, numerous modifications and variations of the present invention are possible in light of the above teachings. It is therefore to be understood that within the scope of the appended claims, the invention may be practiced otherwise than as specifically described herein. Accordingly,

What is claimed as new and desired to be secured by letters patent of the United States is:

1. A method of producing holograms using light of limited coherence comprising the steps of:
   providing a laser light beam,
   illuminating a hologram recording plate with a first portion of said laser light beam,
   providing a second portion of said laser light beam for illuminating an object of which a hologram is to be formed,
   splitting said second portion of said light beam into two subsidiary beams,
   directing said two subsidiary beams in a respectively inclined relationship onto said object over a path length for one of said subsidiary beams which differs from the path length of the other of said subsidiary beams by at least one coherence length of said laser light;
   illuminating said hologram plate with light scattered from said object,
   arranging said object in the path of said two respectively inclined subsidiary beams to produce local intensity fluctuation having maxima and minima at said object, said local intensity fluctuations corresponding to each frequency of light present in said light from said subsidiary beams such that the intensity maxima at any point on said object corresponding to one frequency of said laser light do not predominantly coincide with the intensity maxima of any other frequency in said laser light, whereby the contrast in the speckle pattern from said object recorded at said hologram plate under the illumination in minimized.

2. A method of producing holograms using light of limited coherence as in claim 1, further comprising the step of:
   causing said maxima and minima of said intensity fluctuations to have an extent which is below the level of optical resolution.

3. A method of producing holograms using light of limited coherence comprising the steps of:
providing a first laser light beam,
illuminating a hologram recording plate with said first laser light beam,
providing a second laser light beam for illuminating an object of which a hologram is to be formed,
directing said second laser light beam onto a diffusely scattering body for causing said diffusely scattering body to illuminate a given point on said object with at least two beams of light, the path lengths of which differ by at least one coherence length of said laser light,
said step of directing including the step of producing local intensity fluctuations having maxima and minima at said object, said local intensity fluctuations corresponding to each frequency of said laser light scattered from said diffusely scattering body such that the intensity maxima at any point on said object corresponding to one frequency of said laser light do not predominantly coincide with the intensity maxima of any other frequency in said laser light, whereby the contrast in the speckle pattern from said object recorded at said hologram plate under the illumination in minimized.

4. A method of producing holograms using light of limited coherence as in claim 3 further comprising the steps: of selecting the dimensions of said diffusely scattering body and arranging its position in said second laser light beam to provide said path length difference of at least one coherence length between said at least two beams of light.

* * * * *